United States Patent [19]

Sheppard

[11] Patent Number: 5,186,483
[45] Date of Patent: Feb. 16, 1993

[54] COUPLING ARRANGEMENT

[75] Inventor: Michael J. Sheppard, Mona Vale, Australia

[73] Assignee: Lynline Pty Limited, Sydney, Australia

[21] Appl. No.: 834,975

[22] PCT Filed: Nov. 11, 1988

[86] PCT No.: PCT/AU88/00439

§ 371 Date: Jul. 6, 1990

§ 102(e) Date: Jul. 6, 1990

[87] PCT Pub. No.: WO89/04260

PCT Pub. Date: May 18, 1989

Related U.S. Application Data

[63] Continuation of Ser. No. 499,314, Jul. 6, 1990, abandoned.

[30] Foreign Application Priority Data

Nov. 13, 1987 [AU] Australia ................. PI5402

[51] Int. Cl.$^5$ ................................. B60D 1/42
[52] U.S. Cl. ......................... 280/494; 280/492; 280/506; 403/57
[58] Field of Search ............... 280/477, 492, 494, 506, 280/509, 510, 513; 403/57, 53; 213/62 A

[56] References Cited

U.S. PATENT DOCUMENTS

| | | | |
|---|---|---|---|
| 1,229,465 | 6/1917 | Hudson | 280/492 |
| 2,133,065 | 10/1938 | Weber | 280/506 |
| 2,221,278 | 11/1940 | Utterback | 280/492 |
| 2,441,024 | 5/1948 | Rostu | 280/477 |
| 2,444,086 | 6/1948 | Baker | 280/494 |
| 2,779,607 | 1/1957 | Milhizer | 280/510 |
| 2,890,065 | 6/1959 | Shaffer | 280/492 |
| 3,175,846 | 3/1965 | Arbaugh | 280/492 |
| 3,490,790 | 1/1970 | Kees | 280/492 |
| 3,998,471 | 12/1976 | Lutchemeier | 280/492 |
| 4,711,461 | 12/1987 | Fromberg | 280/494 |

Primary Examiner—Margaret A. Focarino
Assistant Examiner—A. M. Boehler
Attorney, Agent, or Firm—Harness, Dickey & Pierce

[57] ABSTRACT

A towing coupling to connect a towing vehicle to a trailer, the coupling comprising: a vehicle bar connected to the vehicle; a trailer bar connected to the trailer; an intermediate member adapted to be pivotally connected at a first end thereof to the vehicle bar; and, a releasable member adapted to be releasably and pivotally connected at a first end thereof to a second end of the intermediate member, and to be connected to the trailer bar at a second end thereof; wherein: a first pivot axis is defined by a first coupling arrangement connecting the first end of the intermediate member to the vehicle bar; a second pivot axis is defined by a second coupling arrangement between the intermediate member and the releasable member, the second pivot axis being in a substantially normal direction to the first pivot axis; and a third pivot axis is defined by a third coupling arrangement formed by first and second pivotally connected parts of either the intermediate member or the releasable member, the third pivot axis being in a substantially normal direction to both the first and the second pivot axes.

3 Claims, 8 Drawing Sheets

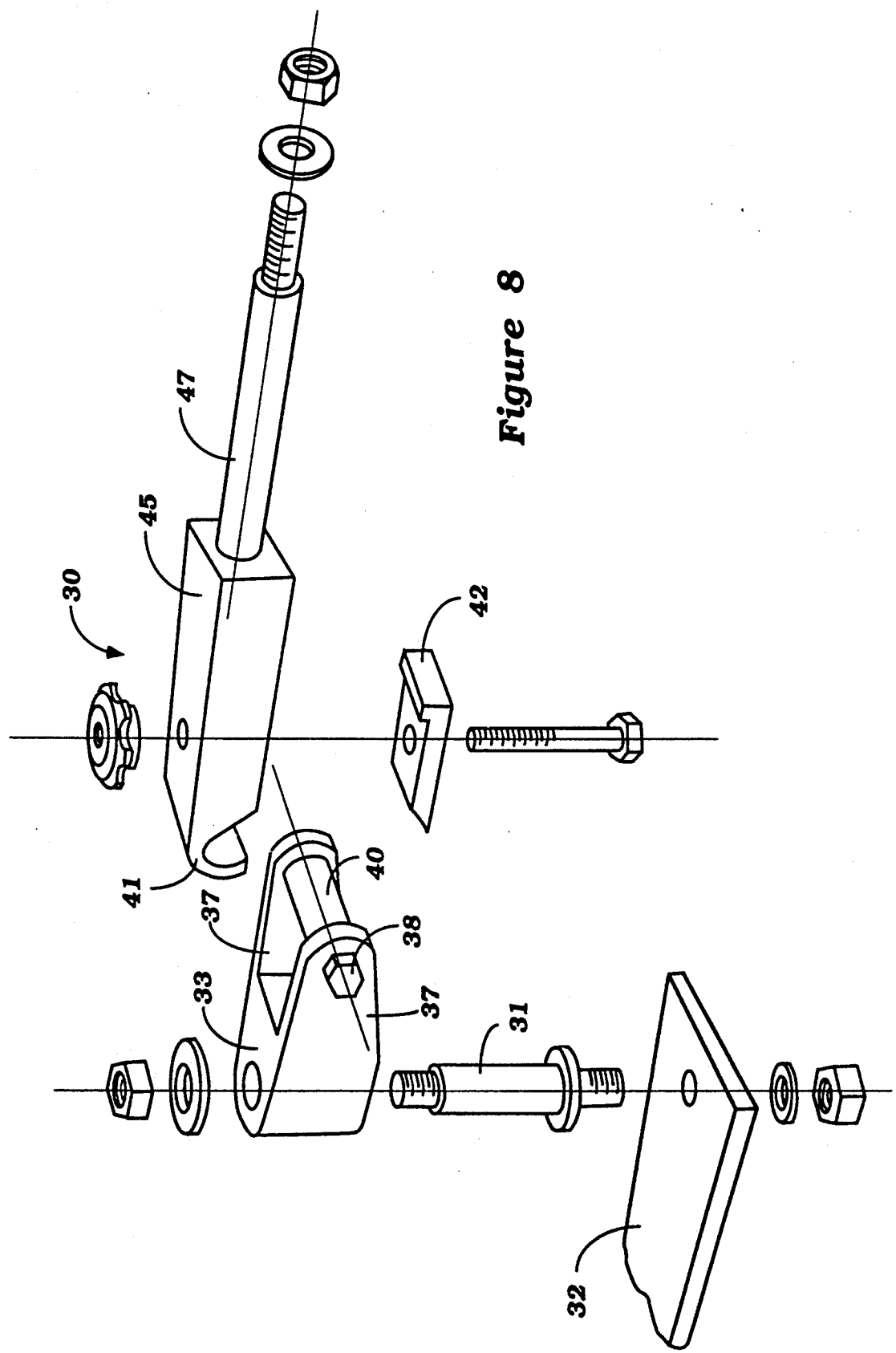

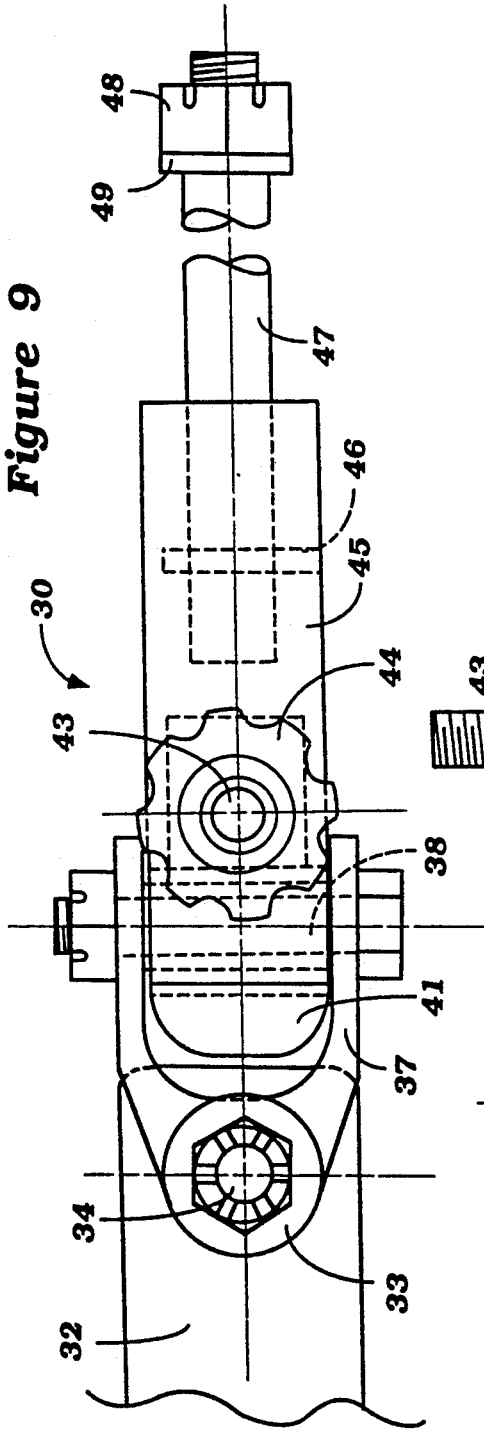
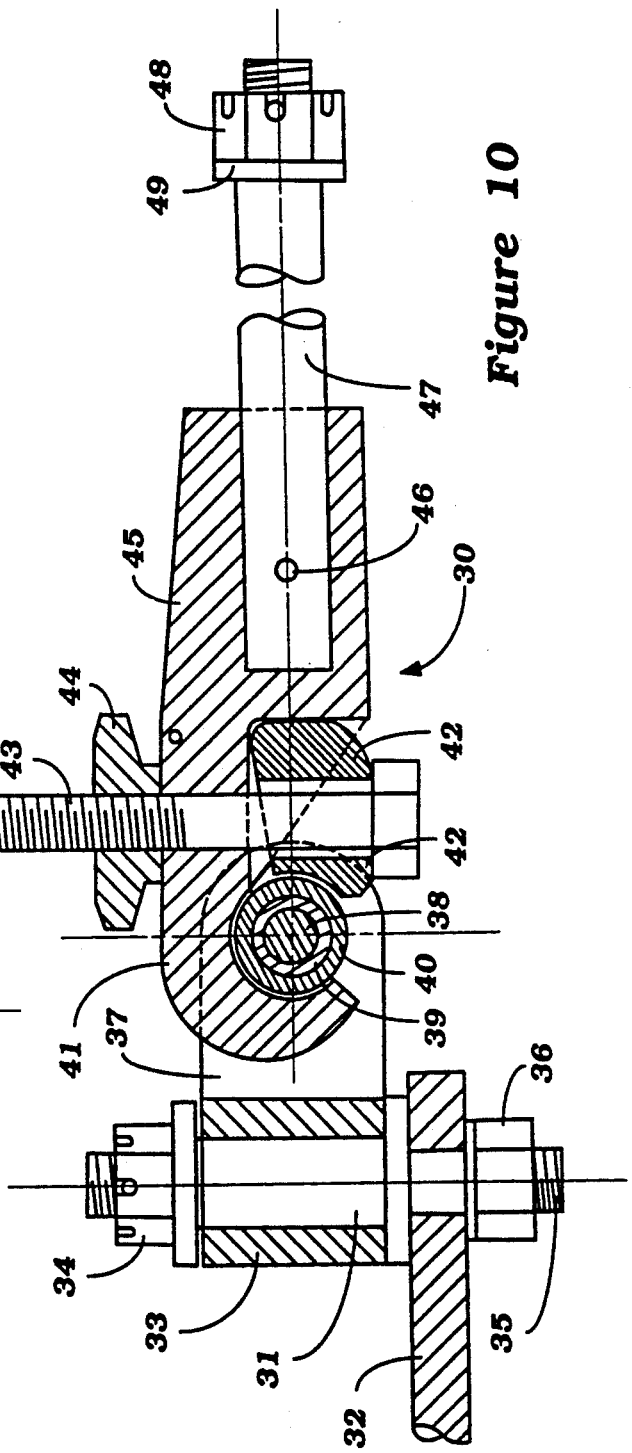

COUPLING ARRANGEMENT

This is a continuation of U.S. patent application Ser. No. 499,314, filed Jul 6, 1990, now abandoned.

BACKGROUND OF THE INVENTION

The present invention relates to an improved tow coupling apparatus, for use between prime movers, such as trucks, automobiles, four wheel drive vehicles, tractors, farming equipment, motor cycles, and their trailers or towed equipment.

Generally, tow couplings are designed to allow a certain range of pivotal movement about three orthogonal axes depending upon the design of the tow coupling. There are many tow couplings presently being marketed, but two major types are predominant. They are, firstly, the various ball type couplings, and secondly, the various swivel ring and pintle hook combinations.

Although each of the alternative designs of such tow coupling arrangements operate in a variety of ways, it is apparent that the easiest design criteria to satisfy has been that of the load requirements of the tow coupling, especially those of the ball type.

The limited pivotal movement of such known ball type couplings is shown in FIGS. 1 and 2. Due to the configuration of such vertically disposed ball coupling arrangements the neck connecting the ball prevents the detachable coupling body rotating more than approximately 11 degrees in any direction relative to the horizontal plane. This limitation has been imposed by the standards set down by the Standards Association of Australia in its publication "Ball Couplings for Automotive Purposes", published in 1968. The standards specify minimum neck diameters as a strength requirement.

In practice it has been found that drivers of motor vehicles towing trailers frequently attempt to negotiate dips and humps wherein the trailer may need to rotate more than this allowable 11 degrees, either laterally or longitudinally relative to the longitudinal axis of the towing vehicle. Where this limitation of the coupling is exceeded, stresses and strains are imposed upon the vehicle, the trailer and the towing device. Damage to the vehicle, the trailer or the towing device is therefore often sustained in such circumstances. The towing device is often broken completely.

A modification to the detachable ball coupling body can overcome the lateral rotational limitation of about 11 degrees of the simple ball coupling. Fabricating the detachable ball coupling body with a longitudinal shaft rotatably attached to the drawbar of the trailer is an alternative practice. However this modification does not overcome the major disadvantage of all ball type couplings.

All ball type couplings suffer the principal disadvantage of being unable to permit the trailer to make a longitudinal vertical plane inclination of more than about 11 degrees plus or minus relative to the longitudinal axis of the towing vehicle as shown in FIG. 1, without causing overt stresses or strains or damage to the towing system.

The swivel ring and pin or swivel ring and pintle hook combinations also have major disadvantages. They are usually used where either, the trailer is very heavy, or the trailer must be capable of being inclined or declined more than approximately 11 degrees relative to the longitudinal axis of the towing vehicle.

The swivel ring coupling is used on agricultural equipment, heavy trailers used typically by statutory authorities, shire councils and contractors, and by trucking firms. The disadvantages of the swivel ring and pintle hook coupling are major. The coupling is necessarily loose which results in annoying rattling. Also, the head of the trailer drawbar moving laterally relative to the longitudinal axis of the towing vehicle, results in the trailer "wandering" from side to side whilst the prime mover and trailer are in motion. That is, the swivel ring necessarily cannot prevent the track of the trailer varying from that of the towing vehicle.

Ball type couplings are by far the most commonly used, especially on light applications such as domestic trailers, boat trailers and holiday caravans. A number of alternative designs marketed purport to overcome the principal disadvantages of both ball type couplings and swivel ring combinations, but, in practice, are generally found to be lacking the qualities that customers require. The qualities that the market demands of a tow coupling include, (i) a much larger degree of pivotal movement than that provided by ball type couplings, (ii) ease of coupling and uncoupling, (iii) freedom from annoying rattling, and (iv) accurate straight line tracking of the trailer.

The present invention seeks to overcome or substantially ameliorate the limitations and disadvantages of the prior art.

SUMMARY OF THE INVENTION

In one broad form the present invention provides a coupling to connect a towing vehicle to a trailer, said coupling comprising:

a vehicle bar connected to said vehicle;

a trailer bar connected to said trailer;

an intermediate member adapted to be pivotally connected at a first end thereof to said vehicle bar; and a releasable member adapted to be releasably and pivotally connected at a first end thereof to a second end of said intermediate member, and to be connected to said trailer bar at a second end thereof; wherein:

a first pivot axis is defined by a first coupling arrangement connecting said first end of said intermediate member to said vehicle bar;

a second pivot axis is defined by a second coupling arrangement between said intermediate member and said releasable member, said second pivot axis being in a substantially normal direction to said first pivot axis; and a third pivot axis is defined by a third coupling arrangement formed by said first and second pivotally connected parts of either said intermediate member or said releasable member, said third pivot axis being in a substantially normal direction to both said first and said second pivot axes.

Preferably, one of the said coupling arrangements is provided with a quick release mechanism for connection and disconnection of the trailer with said trailer vehicle.

In a preferred form of the invention, the tow coupling arrangement of the present invention is provided such that:

said first coupling arrangement permits rotation between said vehicle bar and said intermediate member about a substantially vertical axis;

said second coupling arrangement permits rotation between said trailer bar and said intermediate member about a substantially horizontal axis generally transverse to the direction of travel of said vehicle; and, said intermediate member permits rotation between said first and second parts thereof about a substantially horizontal axis generally in the direction of travel of said vehicle.

In a further preferred form of the invention, the tow coupling arrangement of the present invention is provided such that said first coupling arrangement permits rotation between said vehicle bar and said intermediate member about a substantially vertical axis;

said second coupling arrangement permits rotation between said releasable member and said intermediate member about a substantially horizontal axis generally transverse to the direction of the vehicle; and, said third coupling arrangement permits rotation between first and second parts of said releasable member about a substantially horizontal axis generally in the direction of travel of said vehicle.

BRIEF DESCRIPTION OF THE DRAWINGS

The present invention will become more fully understood from the following detailed description thereof, in connection with the accompanying drawings of preferred embodiments thereof, in which:

FIG. 8 shows an exploded isometric view of an alternative embodiment of the tow coupling;

FIG. 9 details a plan view of the embodiment of FIG. 8;

FIG. 10 illustrates a cross-sectional view of the tow coupling of FIG. 9 taken along the centre line of FIG. 9;

DETAILED DESCRIPTION OF THE PREFERRED EMBODIMENTS OF THE INVENTION

Figure 1:
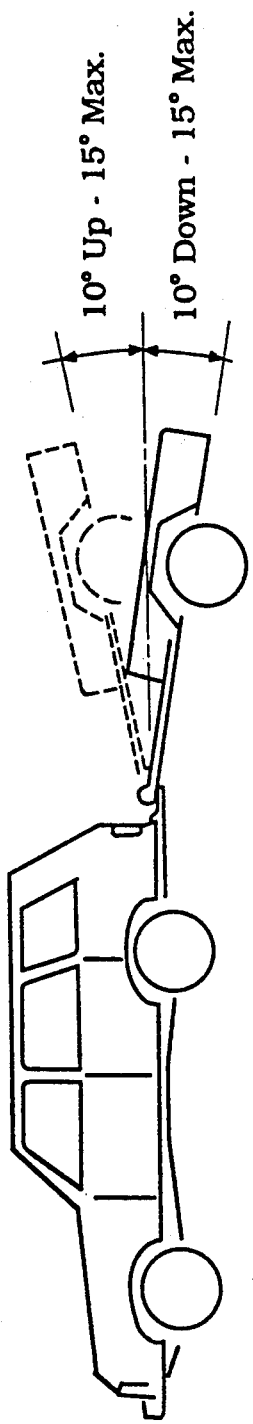
FIG. 1 illustrates the limits of longitudinal vertical movement provided by a conventional fixed ball joint hitch.
Figure 2:
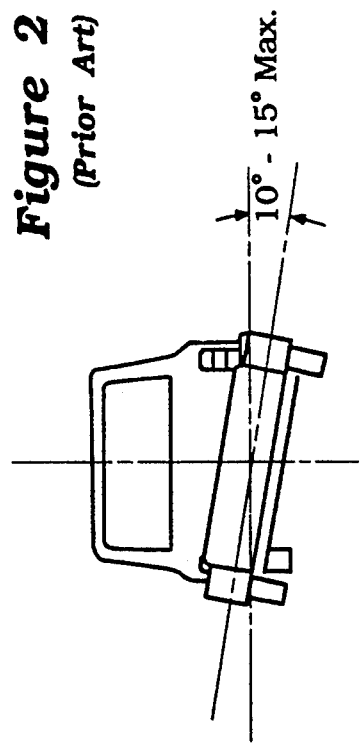
FIG. 2 illustrates the limits of rotation about a longitudinal axis provided by the conventional fixed ball joint hitch of FIG. 1.

In FIGS. 1 and 2 are illustrated the limited amounts of movement provided by conventional fixed ball joint tow couplings. Typically, as shown in FIG. 1, only about 10°–15° maximum angular rotation, is allowed by prior art ball joint tow couplings.

Figure 3:
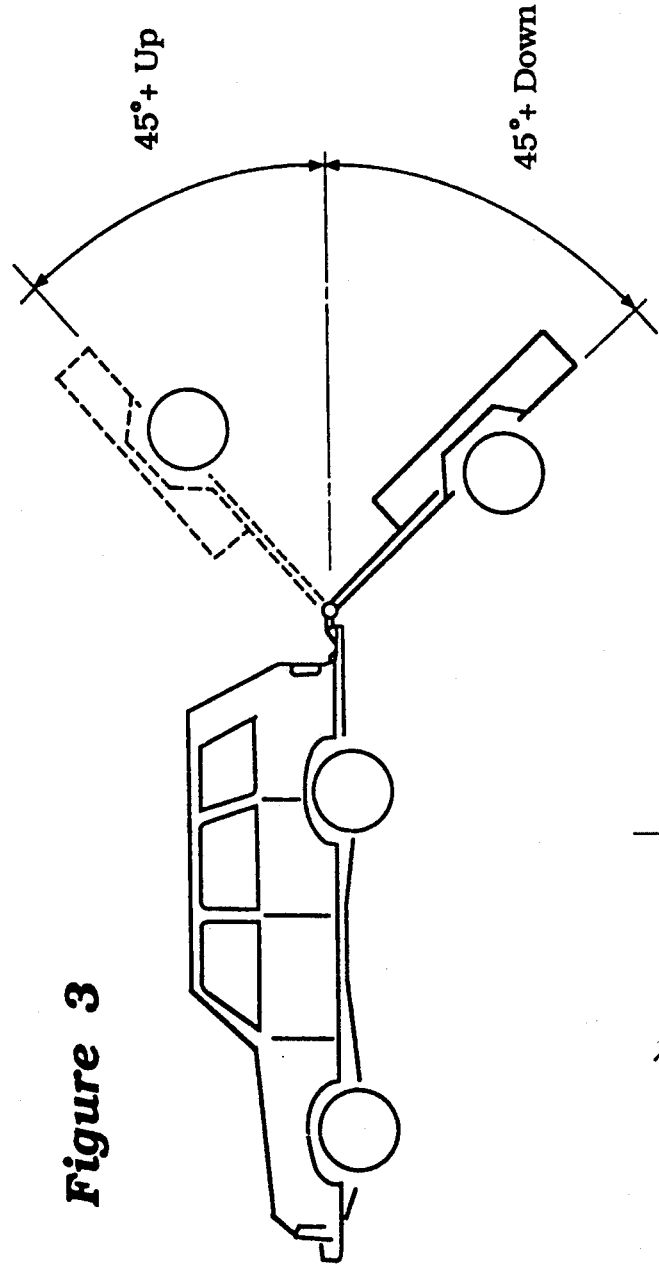
FIG. 3 shows the typical longitudinal vertical movement of the tow coupling in accordance with the present invention.
Figure 4:
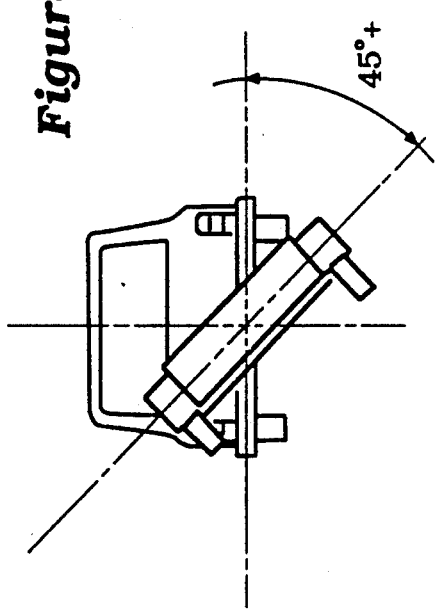
FIG. 4 shows the typical rotational movement about the longitudinal axis of the tow coupling of the present invention.

In FIGS. 3 and 4, however, the significant advantages of the tow coupling in accordance with the present invention are illustrated. As seen in FIG. 3, the tow coupling of the present invention allows inclinations of typically 45° between the longitudinal axes of the vehicle and the trailer. Similarly, as shown in FIG. 4, lateral rotational inclinations of typically 45° are also allowed. Larger angles of inclination and rotation are also possible with appropriate but small consequential modifications made to the tow coupling.

Figure 5:
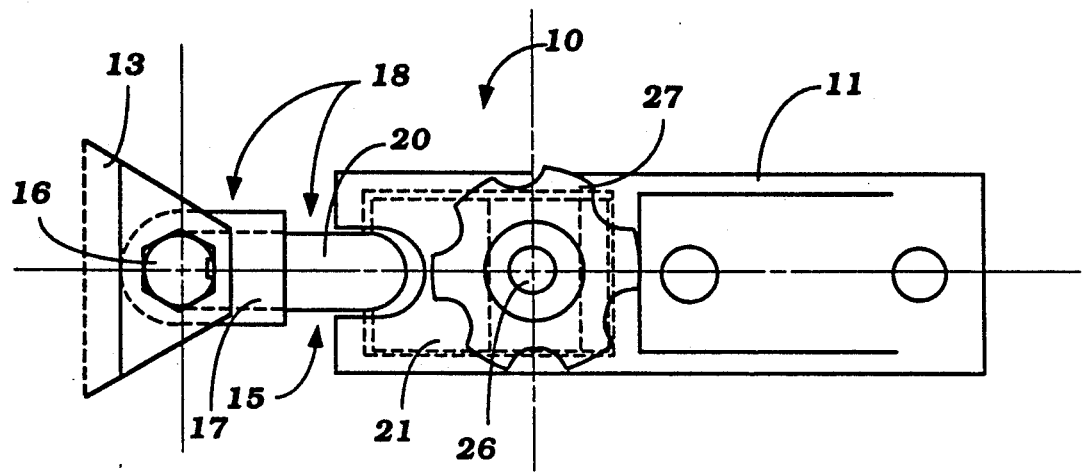
FIG. 5 details a plan view of a first embodiment of the tow coupling in accordance with the present invention.
Figure 6:
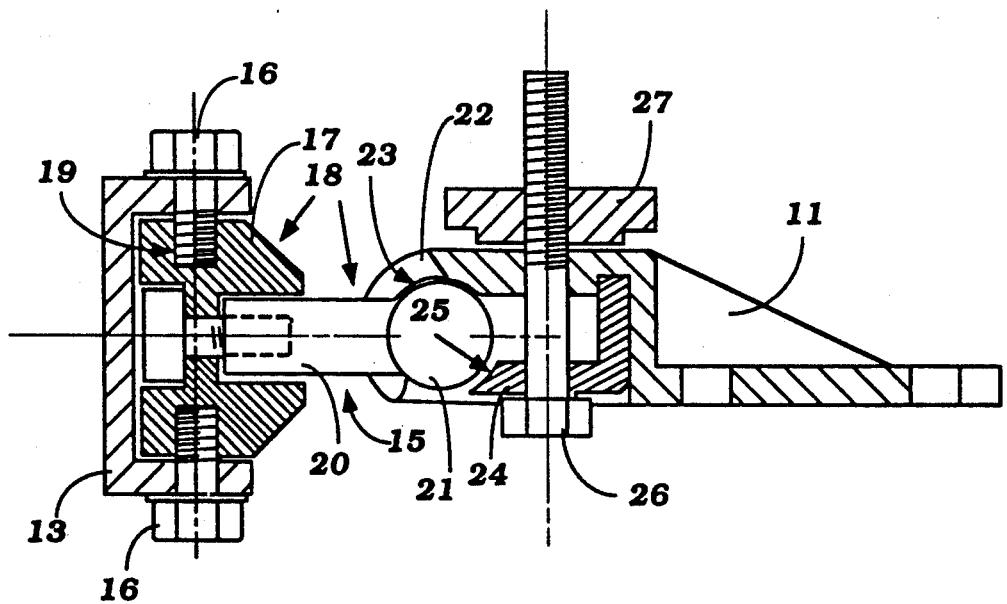
FIG. 6 illustrates a cross-sectional view of the tow coupling of FIG. 5, taken along the centre line of FIG. 5.
Figure 7:
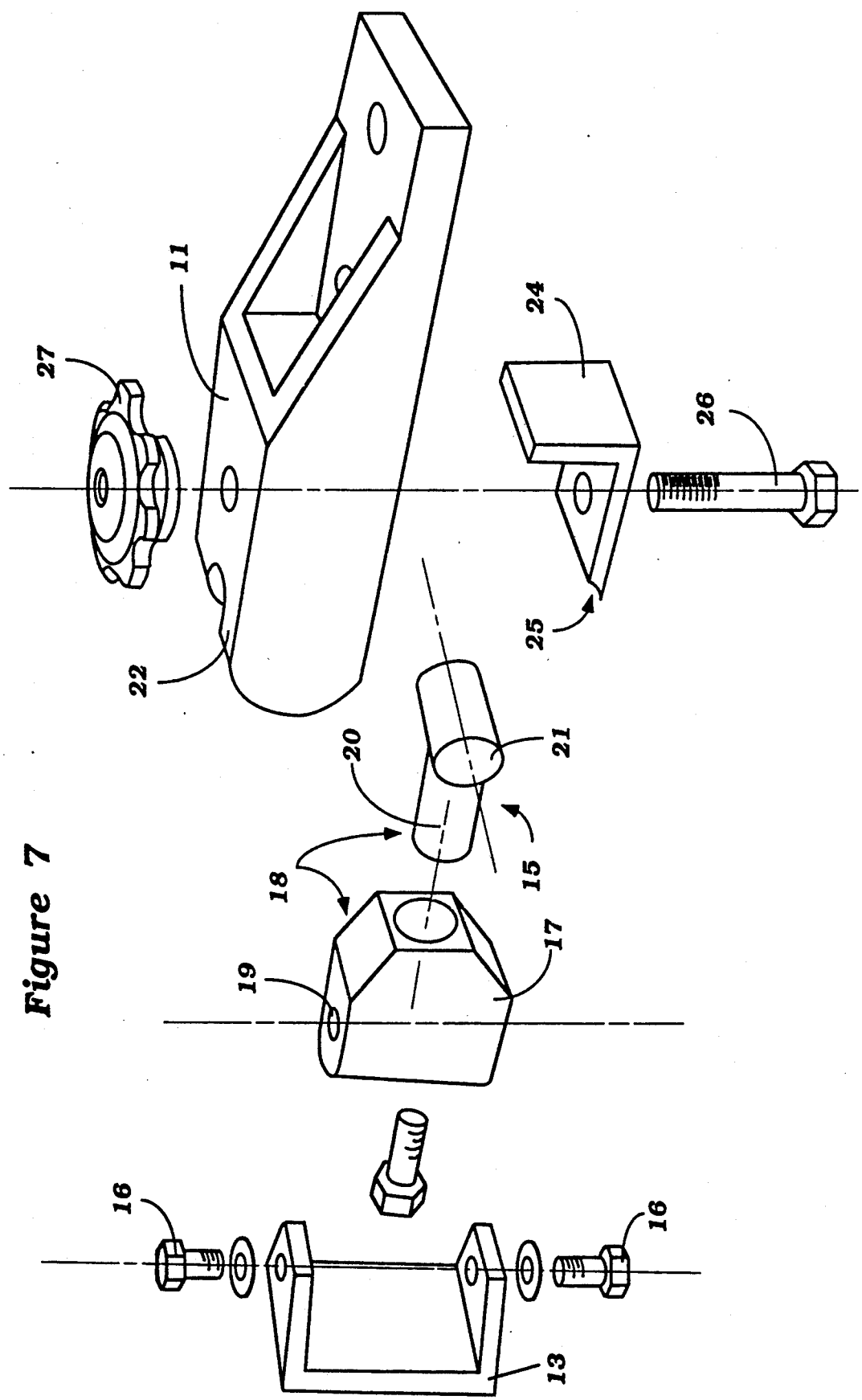
FIG. 7 shows an exploded isometric view of the two coupling of the present invention.

FIGS. 5 to 7 depict a tow coupling apparatus 10 in accordance with a preferred embodiment of the present invention comprising a first mounting bracket 13 for connection to the prime mover and having a pivot pin 16 mounted therefor, a coupling member 18 having a body 17 pivotally supported by said pivot pin 16, and a T-shaped member 15 releasably mounted in a second mounting bracket 11 for connection to the trailer, wherein pivotal movement between said second mounting bracket 11 and the coupling member 18 is provided.

It is envisaged that the first mounting bracket 13 will be mounted to either the tongue of a conventional towbar or tow-bar connection of a motor lorry, or a suitable bracket arrangement provided on a motor cycle.

Preferably, the pivot pin 16 mounted thereto will be disposed vertically (ie to provide a vertical pivotal axis).

The coupling member 18 comprises a body 17 and a T-shaped member 15 projecting from said body 17. The body 17 is provided with pivotal bores 19 to accommodate the pivot pins 16, and the T-shaped member 15 (having a stem-portion 20 and a transverse arm portion 21) is pivotably supported on the body 17 (ie, a swivel) about an axis normal to the longitudinal axis of the pivotal bores 19. Further, the swivel axis of the T-shaped member 15 with the body 17 is co-existant with the longitudinal axis of the stem-portion 20 of the T-shaped member 15 wherein the transverse arm defines the pivotal axis therefor.

The transverse arm portion 21 of the T-shaped member 15 has a circular cross-section and is releasably located within a recess in the second mounting bracket 11 adapted to pivotably support said T-shaped member 15.

The second mounting bracket 11 is provided with a movable "jaw" arrangement, being movable between a closed configuration wherein the transverse arm portion 21 of the T-shaped member 15 is securely, though pivotably supported therein, and an open configuration wherein the transverse arm portion 21 of the T-shaped member 15 is conveniently removable/insertable. The jaw arrangement of the second mounting bracket 11 comprises an upper section 22 having a curved inner surface 23 consistent with the outer curvature of the transverse arm section 21, and a lower section 24, also having a curved inner surface 25 consistent with the curvature of the transverse arm 21, being movable relative to the upper section to define said closed configuration or said open configuration. The upper section 22 and the lower section 24 of the jaw arrangement are connected via a bolt 26 and a knob 27 (threadably connected to the bolt) adapted to provide the relative movement therebetween. As such, the T-shaped member 15 is pivotably supported on the second mounting bracket 11 about the longitudinal axis of the transverse arm 21 (ie only when the jaw arrangement is in the closed configuration). The pivotal axis defined by the transverse arm section 21 is preferably generally normal to the longitudinal axis of the pivot pin 16.

That is, the tow coupling apparatus 10 is provided with three generally mutually perpendicular pivotal axes, the first defined by the pivot pin 16 (vertical axis), the second defined by the longitudinal axis of the stem-portion 20 (first horizontal axis), and the third defined by the longitudinal axis of the transverse arm portion 21 (second horizontal axis being normal to the first horizontal axis).

It should be appreciated that the relative disposition of each pivotal axis need not be restricted to the above described configuration. That is, it would be obvious to those skilled in the art to arrange the individual integers of the apparatus which provide the pivotal means about three generally mutually perpendicular axes, in alternative arrangements. For example, the second horizontal pivot axis (as defined above) could alternatively be defined by the pivot pin 16 being disposed horizontally rather than vertically; or that the first horizontal pivot axis could be provided on either the first or the second mounting bracket rather than the coupling member; with corresponding configuration changes in order to provide generally mutually perpendicular pivotal axes.

Different configurations of tow couplings are envisaged which would achieve the objects of the present invention.

One such configuration is depicted in FIG. 8, illustrating an alternative embodiment of a tow coupling in accordance with the present invention.

In this embodiment, which will be described in greater detail hereinafter with reference to FIGS. 9 and 10, the tow coupling, generally designated by the numeral 30, is comprised of a coupling body 45 provided with a longitudinal cylindrical shaft 47 extending therefrom, which is adapted to be attached to the trailer. The longitudinal cylindrical shaft 47 forms one of the pivot axes of the coupling, allowing rotation along substantially the longitudinal axis of the trailer. The other end of the coupling body 45 is provided with a claw 41 adapted to engage the roller 40 provided on the intermediate member or axle 38 which links the trailer to the prime mover. The intermediate member is basically comprised of a sleeve 33 provided with a pair of wings 37 extending therefrom to support the roller 40 or axle 38. The roller 40 forms the second pivot axis of the coupling arrangement, allowing rotational movement of the trailer about a substantially horizontal lateral axis. The third pivot axis is provided by a spigot 31 provided through the sleeve 33, connecting the intermediate member to the prime mover whilst allowing rotational movement therebetween about a vertical axis through the longitudinal axis of the vehicle. The configuration of this embodiment of the tow coupling is further described with reference to FIGS. 9 and 10.

In FIG. 9 is illustrated a detailed plan view of the embodiment of the tow coupling described in FIG. 8.

In FIG. 10 is illustrated a detailed sectional elevational view of the embodiment of the tow coupling described in FIG. 8, the plan view of which is shown in FIG. 9.

The embodiment of the tow coupling 30 as shown in FIGS. 9 and 10 comprises the following major components: a spigot 31 which generally remains attached to the towing lug 32 of the prime-mover and which takes the place of the ball of conventional ball type couplings; a sleeve 33 with a pair of wings 37; which generally remains attached to the prime mover; a lateral axle 38 fixed between the wings 37; a claw 41 integral with the coupling body 45 which generally remains attached to the trailer and which constitutes one part of the means of coupling and uncoupling of the prime mover and the trailer; a clamp 42 which clamps the roller 40 and consequently the axle 38 against the claw 41; a longitudinal cylindrical shaft 47 which may be variously attached to the drawbar of the trailer and which permits the trailer to rotate laterally about its longitudinal axis.

The three orthogonal axes are provided by axial rotations about the substantially vertical spigot 35, the substantially lateral axle 38, and, the substantially longitudinal shaft 47.

The spigot 31 is attached to the towing lug or tongue 32 of the prime mover by means of a threaded projection 35 and nut 36. The winged sleeve 33 also generally remains attached to the prime mover and is secured to the spigot 35 by means of a castellated nut 34 and cotter pin.

The trailer is coupled to the prime-mover by means of the claw 41 being placed over the lateral roller 40 which is supported by a spacer 39 and the lateral axle 38. The clamp 42 is then raised by means of the threaded bolt 43 and the nut 44. The roller 40 is clamped tightly between the clamp 42 and the claw 41 to effect coupling of the apparatus Uncoupling consists of loosening the nut 44 to release the clamp 42 such that the claw 41 may be separated from the roller 40. A locking device may be engaged to prevent the nut 44 vibrating loose.

The longitudinal shaft 47 may be variously attached to the coupling body 45. The shaft 47 may be fixed in the body 45 by means of a pin 46 as shown in FIGS. 9 and 10. Alternatively the shaft 47 may be rotatably secured in the coupling body by means of a circumferential groove and a corresponding laterally located pin to permit the shaft 47 to rotate about a longitudinal axis within the body of the coupling.

Figure 11:
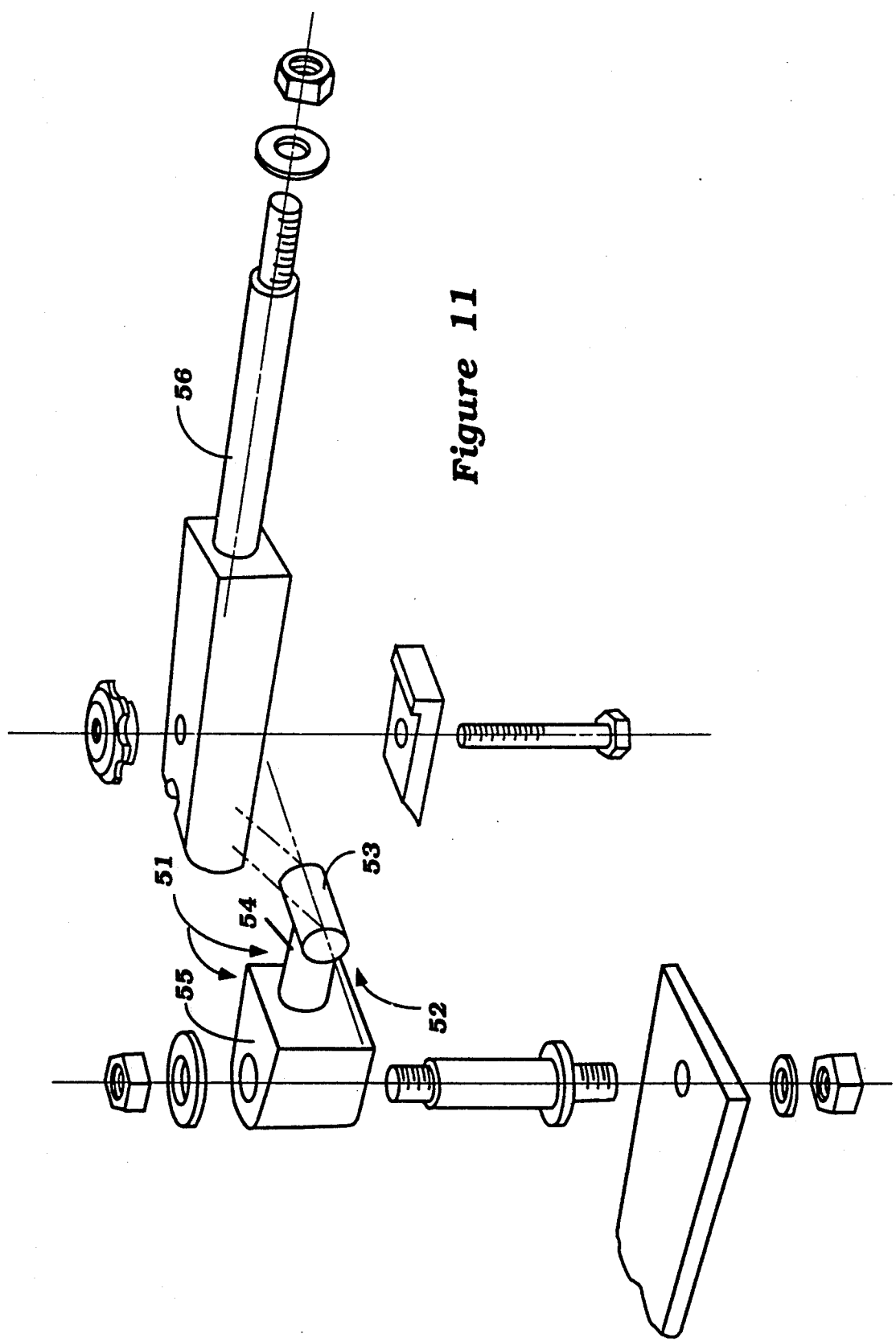
FIG. 11 shows an exploded isometric view of another alternative embodiment of the tow coupling.

In FIG. 11 is illustrated yet another embodiment of a tow coupling arrangement in accordance with the present invention. In this case, a different construction of an intermediate coupling member 51 is provided, such that the T shaped member 52 is fabricated integrally with the sleeve 55 by means of a single arm 54, along the lines of the construction of th embodiment of FIG. 7. In this case, however, the rotational movement about the longitudinal axis of the vehicle is provided for by the cylindrical shaft 56 rather than by the arm 54.

Figure 12:
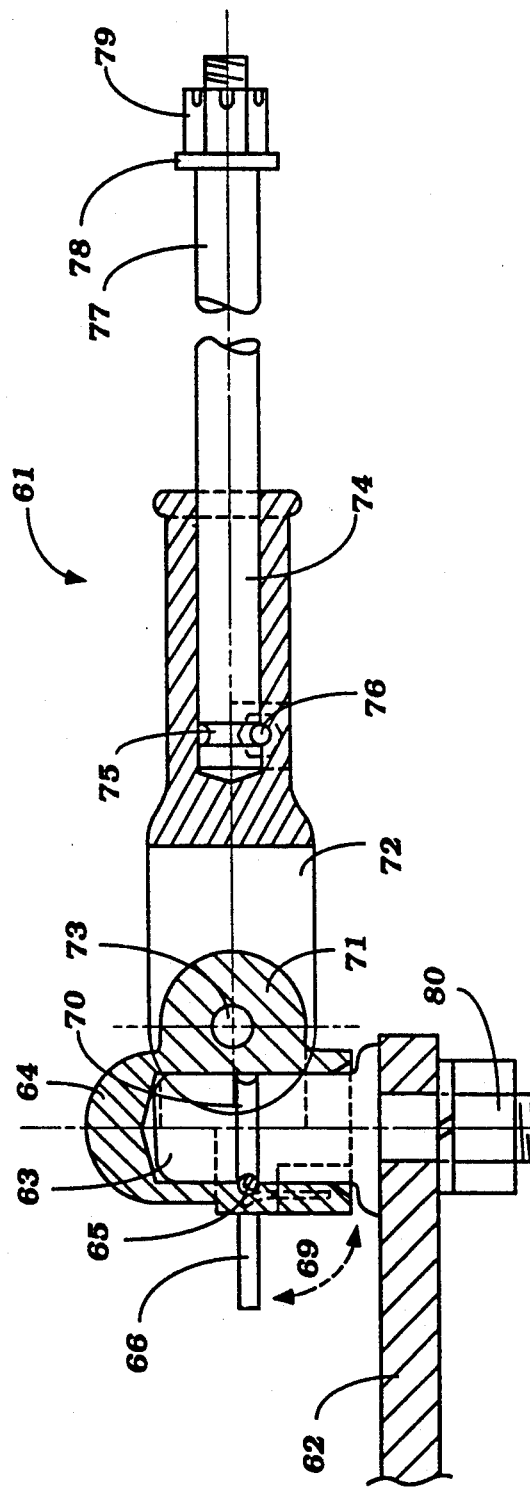
FIG. 12 shows an elevational view of yet another embodiment of a tow coupling in accordance with the present invention; and, FIG. 13 illustrates a plan view of the embodiment shown in FIG. 12.
Figure 13:
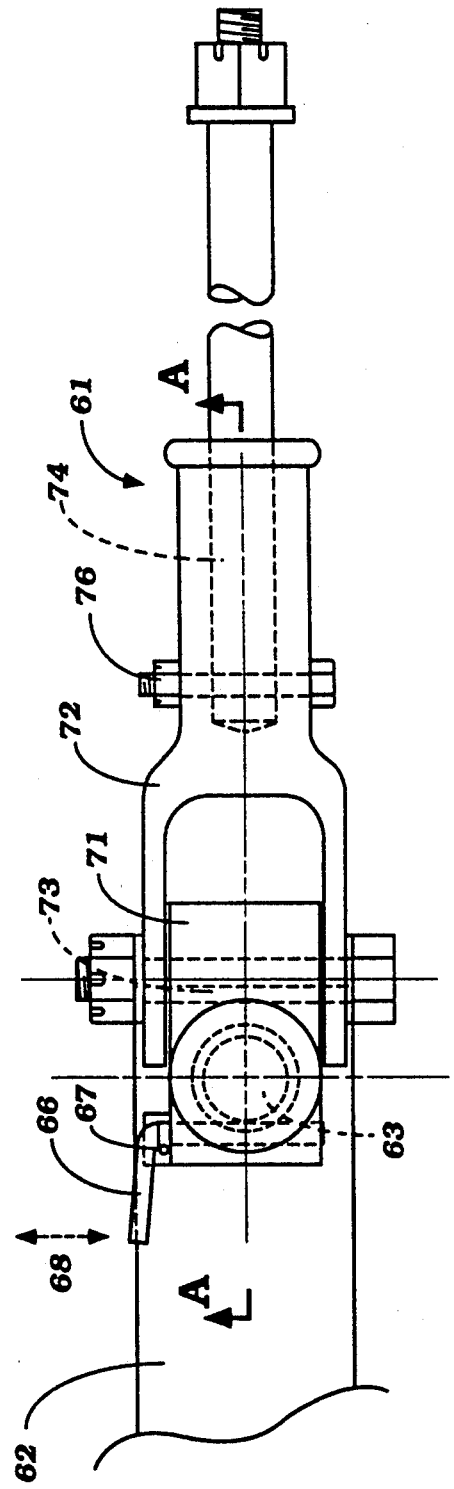

In FIGS. 12 and 13 are shown yet another embodiment of a tow coupling in accordance with the present invention, FIG. 12 illustrating an elevational view and FIG. 13 illustrating a plan view thereof.

The embodiment of the tow coupling 61 as shown comprises the following major components: a spigot 63 which generally remains attached to the towing lug 62 of the prime-mover and which takes the place of the ball of conventional ball type couplings; a closed tube 64 which generally remains attached to the trailer and which constitutes the means of connection and disconnection between the trailer and towing vehicle by placing tube 64 over or removing it from the spigot 63; attached to the tube 64, a pair of swivelling arms 72 which rotate in a substantially vertical plane about the lateral axle 73; attached to the arms 72, a cylindrical shaft 74 and 77 which may be variously attached to the drawbar of the trailer and which permits the trailer to rotate laterally about its longitudinal axis.

The three orthogonal axes are provided by axial rotations about the substantially vertical spigot 63, the substantially lateral axle 73, and, the substantially longitudinal shaft 74 and 77.

The spigot 63 is attached to the towing lug or tongue 62 of the prime mover by means of a threaded projection and nut 80.

When the trailer is attached to the prime-mover the tube 64 is locked into position on the spigot 63 by means of the pin 65 and the corresponding groove 70 in the spigot 63. The pin 65 may be slid in 68 and out 68 of the tube 64 to effect alternately the locking and unlocking of the apparatus.

The locking pin 65 has a handle 66 which may be used to slide the pin in and out 68 of the groove 70 in the spigot 63 and tube 64 to lock the coupling together to prevent accidental uncoupling. The pin 65 is also locked into position by means of a spring steel locating wire 67 which corresponds with a groove in the pin 65 when the pin 65 is inserted and the handle 66 is rotated 69 to the downward position.

The longitudinal shaft 74 and 77 has a groove 75 which by means of corresponding pin 76 anchors the shaft in the longitudinal extension of the arms 72. The groove 75 and the pin 76 also permit the shaft 74 and 77 to rotate about the longitudinal axis within the longitudinal extension of the arms 74.

Therefore, as has been illustrated with reference to each of the embodiments shown, different configurations o the invention are possible to achieve a tow coupling which overcomes the disadvantages of the prior art tow couplings whilst allowing a wide range of pivotal movement about three mutually perpendicular axes.

The tow coupling herein described has the longitudinal rotational flexibility of the swivel ring and pintle hook combinations but without providing the disadvantages of constant coupling rattling and trailer wandering.

The tow coupling herein described has the quick-release features and the positive tracking and alignment of ball type couplings but without their disadvantages of limited longitudinal rotational capacity.

The advantages of the improved tow coupling are that it provides excellent degrees of pivotal movement of the trailer about all three spatial axes relative to the prime mover, thus substantially ameliorating the problems due to induced stresses experienced by, for example, tow-ball type couplings. Further, there is provided an easy to use and convenient quick-release means between the prime mover and the trailer. The apparatus is structurally stable wherein tensile or compressive forces can be tolerated and transmitted thereby without permitting relative lateral movement or shift between components (i.e. "rattling" of the coupling is substantially eliminated).

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A tow coupling to connect a towing vehicle to a trailer, said coupling comprising:
    a vehicle bar connected to said vehicle;
    a trailer bar connected to said trailer;
    an elongated spigot tubular arrangement extending generally vertically from said vehicle bar and having a groove therearound intermediate its ends;
    a cup-shaped member, adapted to be received over said spigot, provided with a groove therethrough adapted to align with said groove of said spigot such that a first locking pin may be provided therein and maintain a locking relationship between said cup-shaped member and said spigot while allowing pivotal movement therebetween defining a first pivot axis, said cup-shaped member also provided with a rearwardly extending extension provided with a generally horizontal bar extending transversely therethrough;
    a link member provided with a pair of arms at a first end therof and a longitudinal bore at a second end thereof, said arms being provided with through holes adapted to align with said bore of said cup-shaped member and said link member is allowed defining a second axis being in a direction substantially normal to said first pivot axis, and, a groove being provided in a substantially horizontal relationship intersecting said longitudinal bore intermediate the ends thereof; and,
    a cylindrical shaft, a first end thereof adapted to be received in said longitudinal bore, and a second end thereof attached to said trailer bar, said first end being provided with a groove provided circumferentially therearound and being adapted to align with said groove of said link member such as to receive a third locking pin such that pivotal movement between said link member and said cylindrical shaft is allowed defining a third pivot axis being in a direction substantially normal to each of said first and second pivot axes.

2. A tow coupling for connecting a towed vehicle to a towing vehicle comprised of a tow vehicle bar adapted to be connected to the towing vehicle, a towed vehicle bar adapted to be connected to the twoed vehicle, means providing a disconnectable connection between said vehicle bars pivotal about only a first pivot axis comprised of a T-shaped member carried by one of said bars having a shank part extending transversely to a rod part and a disconnectable jaw carried by the other of said bars, said disconnectable jaw comprising a first fixed jaw member having a curved recess for engaging said rod part on one side thereof and a second moveable jaw member for detachably engaging the other side of said rod part to provide said detachable connection with said first pivot axis being defined by said rod part, the connection of said T-shaped member to its respective bar provides for pivotal movement of said shank part about a second pivot axis transversely disposed to said first pivot axis, the connection of one of said vehicle bars to its respective vehicle comprising means for providing pivotal movement about a third pivot axis extending transversely to said first and said second pivot axes.

3. A tow coupling as set forth in claim 2 wherein the first fixed jaw member is bifurcated and engages the rod part on opposite sides of the shank portion.

* * * * *